Feb. 18, 1964 C. W. WHEELOCK 3,121,666
NUCLEAR REACTOR FUEL ASSEMBLY
Filed Jan. 25, 1962 5 Sheets-Sheet 1
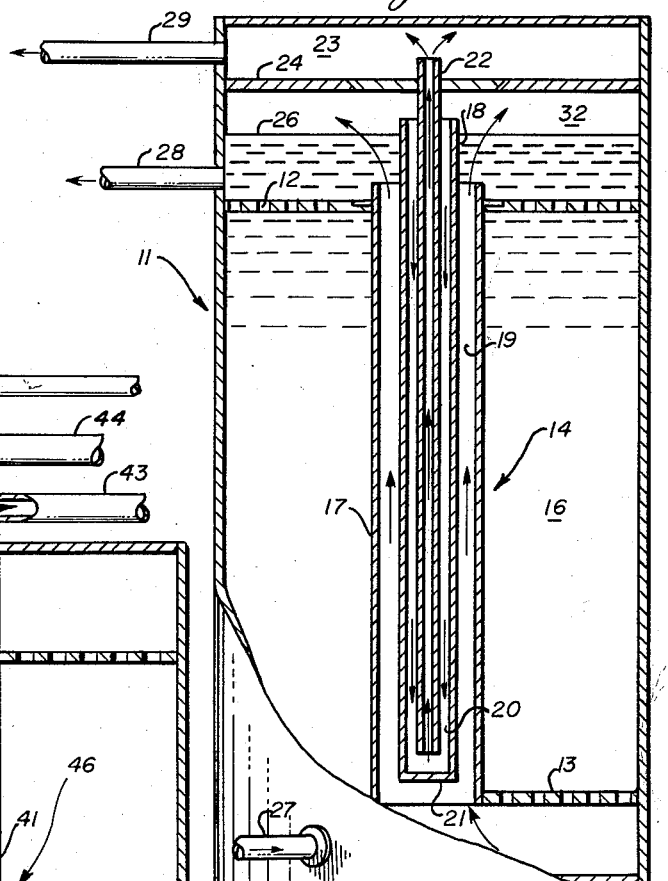
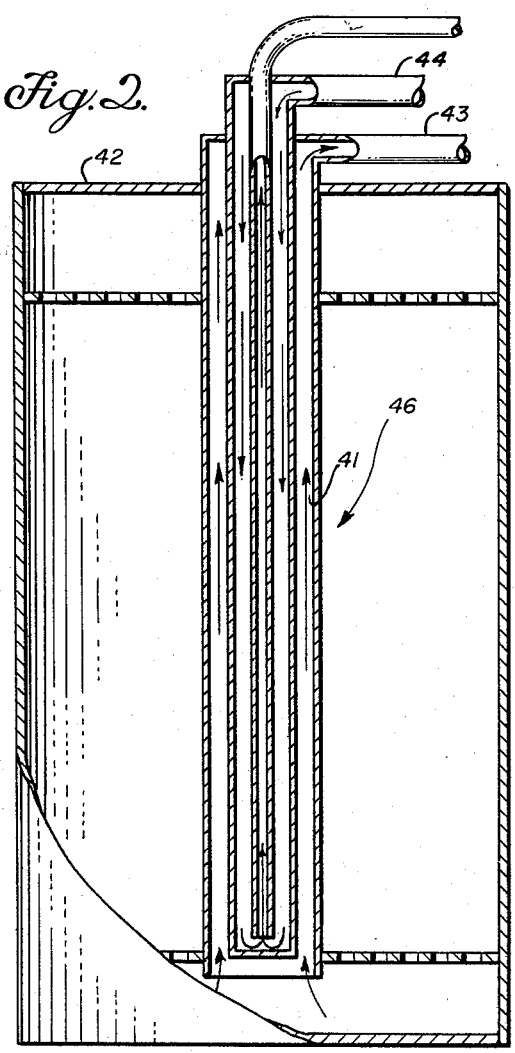
INVENTOR.
CLIFFORD W. WHEELOCK
BY
ATTORNEY Feb. 18, 1964 C. W. WHEELOCK 3,121,666
NUCLEAR REACTOR FUEL ASSEMBLY
Filed Jan. 25, 1962 5 Sheets-Sheet 2

INVENTOR.
CLIFFORD W. WHEELOCK
BY
ATTORNEY

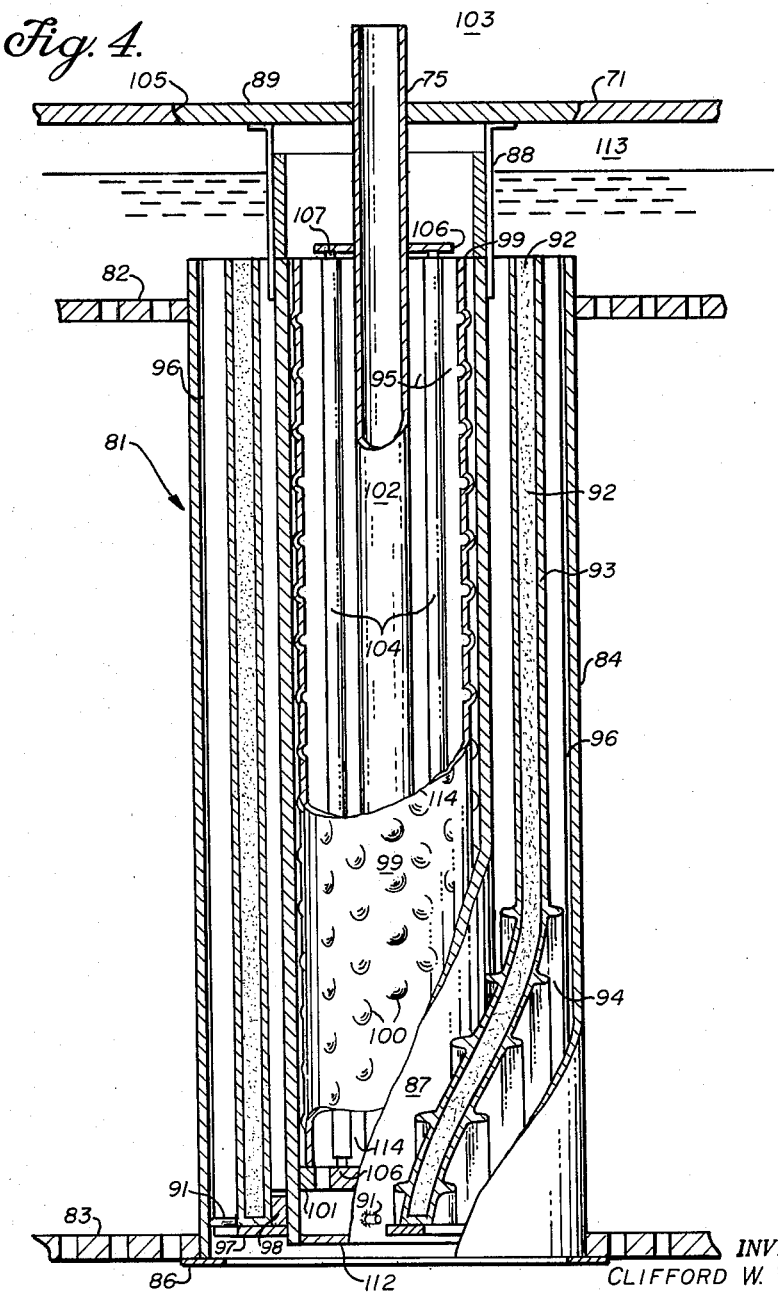

Feb. 18, 1964 C. W. WHEELOCK 3,121,666
NUCLEAR REACTOR FUEL ASSEMBLY
Filed Jan. 25, 1962 5 Sheets-Sheet 4

INVENTOR.
CLIFFORD W. WHEELOCK
BY
ATTORNEY

Feb. 18, 1964  C. W. WHEELOCK  3,121,666
NUCLEAR REACTOR FUEL ASSEMBLY

Filed Jan. 25, 1962  5 Sheets-Sheet 5

INVENTOR.
CLIFFORD W. WHEELOCK
BY
ATTORNEY

United States Patent Office 3,121,666
Patented Feb. 18, 1964

3,121,666
NUCLEAR REACTOR FUEL ASSEMBLY
Clifford W. Wheelock, Encino, Calif., assignor, by mesne assignments, to the United States of America as represented by the United States Atomic Energy Commission
Filed Jan. 25, 1962, Ser. No. 168,857
3 Claims. (Cl. 176—54)

This invention relates to direct-cycle, boiling water nuclear reactors for atomic power plants and, more particularly, to a neutronic reactor fuel assembly and core embodiment for producing superheated steam within a reactor vessel.

The invention provides a neutronic reactor in which water may be vaporized and superheated to temperatures as high as 1000° F. and above during a double pass through any one of a plurality of fuel elements. Each fuel element comprises an assembly of concentric containment tubes held in an appropriate supporting structure, e.g., upper and lower grid structure, within a tank containing coolant liquid such as water or hydrocarbon or a solid moderator. The water or other coolant flows upward through a fuel complex disposed in each outer tube whereby steam is produced directly or by heat exchange of heated coolant outside the reactor. Saturated steam therefrom is then introduced and fed through the inner concentric tube, also containing fuel, which is sufficiently insulated to limit flow of heat outward to the liquid coolant or water, whereby superheated steam is produced by appropriate reactor and flow control. Further novelty resides in the precise configurations and details of the several preferred embodiments, Additional solid moderator may be contained within the core.

A direct-cycle, boiling water nuclear reactor is one in which fissioning of the nuclear fuel produces heat which boils water contained within the core of the reactor. The steam formed thereby may be conveyed to a turbogenerator to generate electricity. U.S. Patent application S.N. 518,427, filed June 28, 1955, now Patent No. 2,936,273, on behalf of Samuel Untermeyer, describes a direct-cycle boiling water nuclear reactor which may be modified in accordance with the teachings of this invention to generate super-heated steam within the reactor core.

The use of saturated steam to drive a turbine is extremely inefficient. In modern conventional central power plants, superheated steam is invariably employed since the thermal efficiency of the turbine increases with an increase in steam temperature. The combination of a nuclear reactor, a steam producing boiler, and a superheater into one assembly has been a primary objective of power reactor designers. However, heretofore, a satisfactory means of producing steam and superheating it within a single symmetrical fuel assembly to the temperatures desired for modern power plants, 1000° F. to 1050° F. has not been available.

The first proposals for superheating steam within a nuclear reactor core were made by Herbert E. Metcalf, U.S. patent application S.N. 649,408, filed February 21, 1946, now Patent No. 2,787,593, and Eugene P. Wigner, U.S. patent application S.N. 769,301, filed August 18, 1947, now Patent No. 2,806,820. In their reactor systems, however, water was heated within the reactor core and flashed into steam outside of the reactor vessel. The steam was then directed back into the reactor core where it was superheated. The systems described were not efficient steam producers since steam was not initially produced within the core.

Subsequent to the invention of the boiling water reactor by Samuel Untermeyer described in his patent application hereinbefore referenced, it was proposed to boil the water and superheat the steam within the same reactor core as evidenced in the patent application of Michael Treshow, S.N. 655,155, filed April 25, 1957, now Patent No. 2,938,845. In the Treshow system, water was boiled in the reactor tank exterior to the fuel elements. The resulting steam was piped out of the reactor tank and then reintroduced into the reactor core to channels within the fuel elements wherein the steam was superheated. Considerable piping and equipment were required to recirculate the saturated steam into the interior of the fuel elements in the active core.

Other proposals have been made for producing and superheating steam within the same reactor core whereby the steam would be produced in a particular portion of the core such as in a peripheral zone at the exterior of the core and then superheated in a central zone. In these systems, it has been the usual practice to produce the steam as the coolant flows through at steam producing zone of the core in the opposite direction. Proper ducting is required between the steam producing zone and the steam superheating zone to provide for the necessary steam flow.

An embodiment for producing superheated steam by production of saturated steam in the periphery of a reactor core and recirculation into the central active portion, disclosed and claimed in an application of Joseph H. Harrer et al. for U.S. Letters Patent, S.N. 27,462 (1960), now Patent No. 3,049,487, entitled Nuclear Reactor Fuel Assembly, is also acknowledged. In this embodiment the outer core region consists of fissile fueled tubes which contact water to produce saturated steam. The saturated steam flows to a chamber at one end of the core and then is directed back in an in-and-out pass through concentric fuel tubes sealed at one end in the central core portion, whereby superheated steam for a turbine loop is produced. While the prior art as represented by the foregoing embodiments produces saturated and/or superheated steam within the critical core region of a neutronic reactor or by contact with heated coolant therefrom, several inherent problems in the prior art designs are apparent which preclude formation and superheating of steam in a single fuel element assembly of a conventional reactor, particularly liquid cooled, liquid moderated reactors employing fuel elements comprising concentric cylinders of fissile materials. Specifically, the prior art embodiments produce steam in an outlying or separated area in the reactor and superheat the steam in a second pass through a different portion of the reactor, thereby requiring special construction and the solution of different engineering problems in different portions of the reactor. Further, prior art attempts to produce superheated steam in an element submerged in liquid coolants or moderators have not been practical because the permissible temperature differential was limited. The usual temperature of operation in the prior art embodiments for producing superheated steam is only of the order of 600° F. or below, maximum. The upper temperature limitation is ordinarily determined by the materials of construction which have the requisite cross section for thermal neutrons, structural strength at the desired temperatures, and proper sizing commensurate with costs of construction and design factors. Temperatures as high as 1000° F. are thereby generally precluded and uniform temperature gradients have not been stressed. Obviously, where superheated steam is to be produced in a double pass through the same fuel element, there should be a proper heat balance and temperature gradient both longitudinally and transversely, along each fuel assembly, rather than an abrupt flashing of the water to steam or of water to superheat saturated steam along a limited area in each tube surface in order to obtain maximum utilization of reactor heat.

The present invention comprises a neutronic reactor particularly adaptable to use with water or hydrocarbon coolant in which superheated steam is produced directly in one or more passes through each of a plurality of fuel assemblies held by appropriate supporting structure. Specifically, each fuel element comprises at least two concentric tubes, the outer of which absorbs neutrons only slightly and is serviceable at moderate temperature. The inner tube may be an appreciably stronger absorber of neutrons and be a material having structural strength at high temperatures. In order to control transverse cross sectional heat flow, the inner cylindrical space is insulated from the outer annulus by insulation means carried by the inner tube. Fissile fuel is disposed within and/or along both the annular and inner cylindrical passages. Water or other coolant directed through the annular area is heated along a gradient to a temperature high enough to produce steam either directly or indirectly in a heat exchanger. The saturated steam so produced is then forced through the inner cylindrical space, along the length of which it is superheated.

In one preferred embodiment structure holding the cylindrical fuel assemblies is enveloped in water which is heated as it passes upward through the annular assembly to produce saturated steam. The saturated steam is collected in an upper plenum from which it is directed downward into the open-ended inner tube where it is superheated. Preferably, the inner tube is closed at the bottom and contains a second concentric cylinder with openings at the bottom thereof, permitting entrance of the superheated steam and appropriate fittings at the top to direct the steam to a turbine or other facility. Further novelty resides in additional embodiments and details discussed hereinafter.

Alternatively, in a second preferred embodiment, the reactor may be moderated by a moderator other than water, e.g., organic hydrocarbon, graphite, beryllia, heavy water, beryllium, etc., disposed exterior to the fuel assemblies. A primary liquid coolant other than water is forced through the annular area between each inner and outer tube in a reactor embodiment in which the material exterior of the tubes may be any moderator material. The discharged heated liquid coolant, e.g, organic hydrocarbon, is then withdrawn from the reactor core and the heat content is converted to steam in a conventional heat exchanger. The steam from the heat exchanger is introduced into the inner tube where it is superheated as in the preferred embodiment. Obviously, many modifications of this alternative design are possible; for example, the exterior moderator may be different from the moderator coolant or it may be the same, i.e., liquid organic hydrocarbon on both sides of the outer tube. Both inner steam and outer liquid moderator passages may be single or double passes, and vertically or horizontally oriented.

From the foregoing brief description, it may be seen that the present invention overcomes the various disadvantages of the prior art boiling water reactors and at the same time has additional inherent advantages. Specifically, since the structure of each of the reactor fuel element assemblies of the invention duplicates each other element, there is a distinct saving in time and money in producing a plurality of uniform components instead of numerous different components. Further, conventional mass production manufacturing techniques may be employed so that special manufacturing equipment and facilities are not required. Insulation of the inner superheated steam passages from the steam producing and liquid heating passageways also permits both higher superheat temperatures and exterior contact with liquid moderator, so that designs may be adapted to use of existing liquid moderated reactors.

Accordingly, an object of the invention is to provide a neutronic reactor design and unitary fuel element structure in which water or a primary heat exchange liquid is heated to a temperature above the boiling point of water and steam is superheated in each individual fuel element unit. Another object of the invention is to provide a single reactor fuel element assembly for both producing and superheating steam therein. A further object is to provide a fuel element assembly for heating water or other primary liquid and also for superheating steam therein over a nearly uniform temperature gradient both longitudinally and radially along any cross section thereof. Another object of the invention is to provide reactor structure for producing and superheating steam in which identical novel fissile fuel element assemblies may be used in combination with prior existing reactor shells and reactor containment designs.

Another object of the invention is to provide a neutronic reactor fuel element assembly both for heating a primary liquid to temperatures of 100° C. or greater and also for superheating steam to temperatures of 1000° F. and higher.

A further object of the invention is to provide a neutronic reactor fuel element assembly for producing and superheating steam in which water or a primary coolant is heated in the annular passages of insulated concentric fueled tubes to a temperature above 100° C. and in which steam is superheated in the central passage. A further object is to produce such structure which boils or heats liquid primary coolant within the annular tube space while the annular tubes are enveloped within solid or liquid core moderator and also superheats steam directed downward through a central portion of the same fuel assembly. A further object is to provide a concentric tube fuel assembly in which an inner superheat cylinder is suitably insulated from an outer liquid heating annulus by metallic or other suitable insulation-creating annulus of low thermal conductivity in the steam passage adjacent to the superheat cylinder exterior wall.

Another object is to provide a nuclear reactor fuel assembly in which neutron flux is conserved by disposing high temperature materials having relatively high cross sections for thermal neutrons in the portions of the element where the neutron flux is lowest.

The invention will be better understood upon consideration of the following description and drawing, of which:

FIGURE 1 is a schematic drawing showing one preferred embodiment of a fuel assembly within the core of a boiling water reactor, in which saturated steam produced in an outer annulus is free to circulate through a central superheat section of the assembly;

FIGURE 2 is a schematic drawing showing another preferred embodiment of a fuel assembly within the core of a boiling water reactor in which coolant heated in an outer annulus is removed from the reactor and steam from an exterior exchanger is introduced into the central superheat section of the assembly;

FIGURE 4 is a cross sectional side view of one preferred fuel element assembly embodiment of the invention positioned within the reactor grid and retained by support from an overhead plug;

Figure 3:
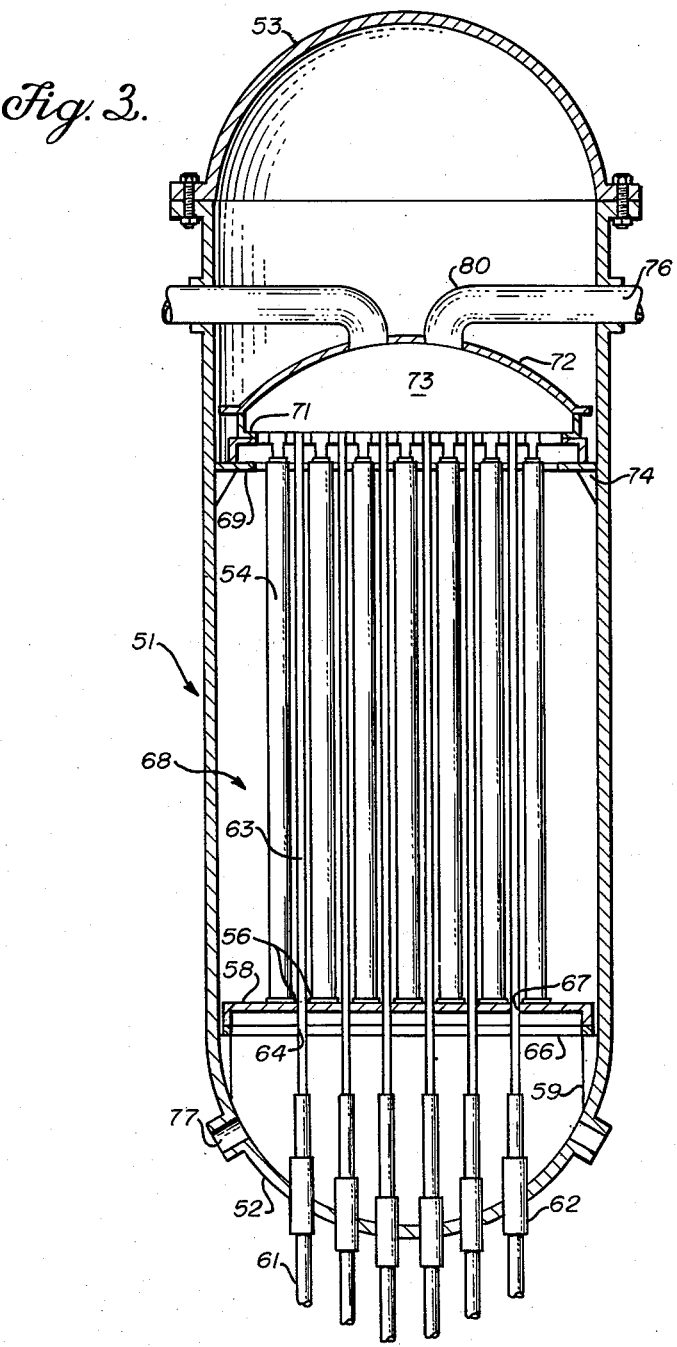
FIGURE 3 is a cross sectional side view of a conceptual embodiment of a boiling water neutronic reactor core and adjacent structure employing the fuel element assembly of the invention.

There is shown in FIGURE 1 a schematic cross sectional core design in combination with a fragmentary, schematic conceptual drawing of a single fuel element unit or assembly of the invention. Specifically, there is shown a conceptual reactor core tank 11 in which are disposed upper and lower fuel element grids 12 and 13. A single fuel element assembly 14 is removably supported between the grids. The core cavity 16 may be filled with any moderator material, but in the preferred embodiment the moderator would be water which is free to flow through both grids and around all fuel assemblies. In the assembly 14 depicted, an outer open-ended cylindrical retainer and support tube 17 is supported to communicate through upper and lower grids 12 and 13. Concentric tube 18 is held (by means not shown) within outer tube 17 as will be shown in more specific embodiments. Assemblies of fissile fuel materials (not shown) are arranged both in the annular region 19 and also within the concentric tube 18 exterior to tube 22. In the preferred embodiment shown in FIGURE 1 concentric inner tube 18 is closed at lower end 21 and contains an additional concentric tube 22 therein which may also optionally carry fuel materials thereon. Innermost tube 22 extends upward and communicates with sealed steam outlet plenum 23 above tube sheet 24, while intermediate tube 18 extends only to a level above fluid line 26 to a steam-filled region of the core cavity 16. There is also provided a lower fluid inlet 27 below lower grid 13 and a fluid outlet 28 just below the top fluid level 26. Steam outlet 29 is also provided.

Functionally, subcooled water enters the outer annulus 19 of the fuel assembly 14, either by natural circulation or by forced flow, and is heated gradually by the fissioning of nuclear fuel as it rises through the annulus 19, wet steam being formed toward the upper end. A mixture of water and wet steam emerges from the top of this annular region to the steam-water interface at the top fluid line 26 where the water and steam separate. The water remaining in the region between the fuel elements, in void space 16, serves as moderator and flows slowly downward for a return pass, if natural circulation is employed, or out through fluid outlet 28 if forced flow is employed. The steam rises into the saturated steam region 32 and enters the annulus 20 where additional heat is transferred from the inner fuel assembly to the steam. Upon reaching the lower end of the fuel element at 21 the steam flows into outlet tube 22, from which it passes back up through the superheat region and into the superheat chamber 23 where it mixes with the steam from other fuel elements (not shown). Further heating of the steam may be accomplished by placing additional fuel assemblies within tube 22. Superheated steam flows therefrom to a conventional steam turbine (not shown) or such other uses for which desired.

An alternate preferred embodiment of the fuel assembly in combination with core structure is shown in FIGURE 2 in which a primary coolant other than water is used. In such a design a liquid primary coolant such as certain organic hydrocarbons already known in the art enters the outer annular channel 41 in the same manner as in the embodiment of FIGURE 1, but instead of boiling and emitting steam to an upper plenum, the primary coolant is heated to a temperature above 100° C. and withdrawn from the upper portion of the reactor through top seal 42 and outlet 43. The heated primary coolant produces steam in a conventional exchanger unit (not shown) and the saturated steam so produced is then introduced back into the intermediate tube channel 44 of the fuel element assembly 46, in the same manner as the embodiment of FIGURE 1.

A conceptual engineering design incorporating a plurality of fuel element assemblies of the invention into an actual reactor embodiment may be seen in FIGURE 3. Except for the fuel element assembly and other slight modifications this design is identical to the design shown and fully described in General Electric Company report GEAP-3686, entitled Nuclear Superheat Project Sixth Quarterly Progress Report, October-December 1960, prepared for the United States Atomic Energy Commission under contract AT(04–3)–189, Project Agreement number 13, by R. T. Pennington, available from the Office of Technical Information, Oak Ridge.

FIGURE 3 shows an exterior reactor pressure vessel 51 with a rounded base 52 closed by a hemispherical cover 53 at the top thereof. Within the vessel the individual fuel element assemblies 54, corresponding to any of the fuel element assembly variations of the invention, such as assemblies 14 and 46 shown in FIGURES 1 and 2, respectively rest upon shoulders 56 around apertures (not shown) in the lower grid and core support plate 58. The support plate 58 is supported in turn by lugs 59 welded to the lower interior portions of reactor vessel 51. The support plate 58 is most generally also provided with additional openings (not shown) to permit ready flow of reactor moderator and/or coolant therethrough. Control rod drives 61 penetrate the base 52 through liquid tight seals 62. The rod drives are spaced to permit extension of rod members 63 through apertures 64 in lower guide plate 66 and apertures 67 in support plate 58, whereby entrance to the core cavity 68 is attained.

The fuel element assemblies 54 are aligned at the uppermost part of their length by an upper support grid plate 69 which also supports the removable, flat lower tubesheet 71 and the upwardly dished cover 72 forming wet steam plenum 73. Upper grid plate 69 rests upon protruding supports 74 welded to the inside of pressure vessel 51. In the preferred embodiment (shown in FIG. 4) tubesheet 71 is load bearing since the individual fuel element inner concentric tube 102 is suspended therefrom by means of tapered plug 89 forming a tight fit with tubesheet openings 105. Superheat steam conduits 80 (FIG. 3) lead from the upper plenum 73 through the upper portion of vessel 51 to a plurality of outlets 76. Entrances 77 are also provided in the base 52 for return of coolant.

It will be understood that the reactor embodiment of FIGURE 3 described immediately above is explicatory only and has been shown to enable a better and more complete understanding of the fuel element assemblies of the invention. Obviously further reactor modifications would be necessary in order to employ the alternate concept shown in FIGURE 2. Other superheat reactor designs could be used, but the reactor embodiment selected is part of the invention only so far as it cooperates with the novel features of the complete assemblies pointed out herein and claimed in the appended claims.

Figure 5:
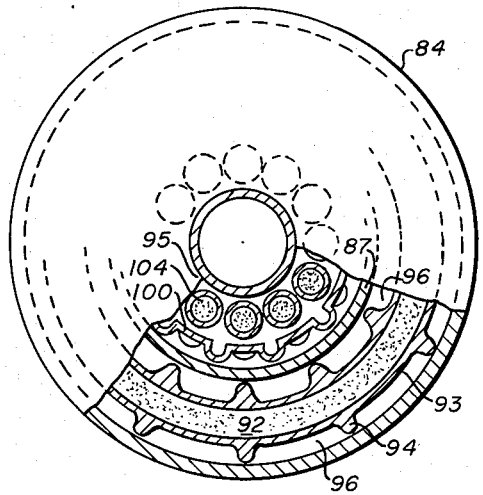
FIGURE 5 is a cross sectional top view of a transverse section of a preferred fuel element assembly embodiment having a tubular fuel element disposed in the outer annulus.

One preferred embodiment of the fuel element assembly is shown in FIGURES 4 and 5. Each fuel assembly 81 is adapted for downward insertion and positioning within a core retained, as in the reactor core shown in FIGURE 3, by means of grids 82 and 83; however, with proper modifications the assemblies could be inserted upwardly into a core, or even held therein in a horizontal position. The fuel assembly consists of an outer sleeve or tube 84 held at the base of the bottom grid aperture by overlapping catches or shoulders 86. Such outer tube, open at both ends, may alternatively be carried by the upper plug 89 if desired, and in certain reactor embodiments it may be necessary to include hold down means (not shown) in order to prevent such tubes from being lifted from the shoulder 86 by the force of the coolant. Within tube 84, and concentric therewith, is shorter closed inner pressure tube 87 carried by supports 88 attached to plug 89. At the bottom of tube 87 radial fingers 91 index and position the inner tube 87. Both tubes function as containment means.

Inner tubes 87 and 102 are fabricated from a metal which is structurally strong at high temperatures, such as stainless steel. The outer tube 84, which operates at a lower temperature may be made from zirconium, an alloy thereof, or possibly sintered aluminum-aluminum oxide. The materials of construction of these tubes is an important factor in determining neutron economy, as discussed hereinafter.

Figure 6:
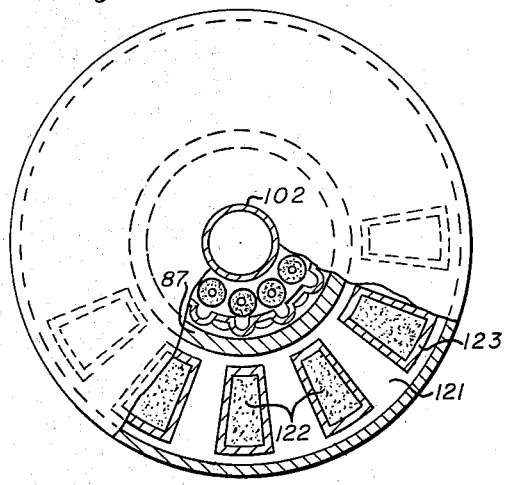
FIGURE 6 is a cross sectional top view of a transverse section of a preferred fuel element assembly embodiment having tubular fuel elements disposed in the outer annulus.

Between the inner and outer containment tubes 87 and 84 is disposed fuel material 92 in the form of an annular ring, or the configuration shown in FIGURE 6, or in other configurations such as vertically disposed fuel pins. This fuel functions to heat coolant and/or vaporize water at moderate temperatures and consequently metallic fuels such as a U-Mo alloy may be used which may be less satisfactory at superheat temperatures. Other fuels such as $UO_2$ in the form of pins may also be used. The fuel tube 92 is typically clad with aluminum or sintered aluminum-aluminum oxide cladding 93 having extended surfaces 94 in the form of fins, as shown in FIGURE 5, which space the fuel from the container tube 84 and forming passages 96 for the passage of coolant. Also, more than one concentric fuel tube may be used. In the preferred embodiment shown in FIGURE 4 the clad fuel tube 92 seats firmly in the down position on shoulder 97 extending outward from the base of pressure tube 87 and is spaced therefrom by a plurality of spacers 98 also carried by top and bottom pressure tube 87. Support 88, welded or otherwise fastened to the outside upper portion of pressure tube 87, prevents undesired lifting of the fuel cylinder 92 from lower shoulder 97.

Since inner pressure tube 87 serves to contain superheated steam generated therein, insulation liner 99 is provided to minimize the flow of heat outwardly. The amount of insulation required is dependent upon the specific reactor conditions and embodiment. In the preferred embodiment of FIGURES 4 and 5 inner tube 87 operates at a temperature very nearly that of the coolant in the annular passages 96 with which it is in contact. Outward flow of heat from superheat passageway 95 is prevented by thin metallic liner 99, e.g., stainless steel, which has been dimpled as indicated by 100 to form raised points of minimum contact area protruding against tube 87. The dimpled liner 99 is held and positioned at the bottom of inner tube 87 by means of shoulder 101 or other equivalent means. No upper restraint is ordinarily necessary in the embodiment of FIGURE 4 for the reason that in the embodiment shown the inward and downward steam flow tends to hold the dimpled tube liner in position. The space between the inner pressure tube 87 and the dimpled insulator 99 becomes filled with relatively stagnant steam during operation, thereby minimizing heat flow.

Within inner pressure tube 87 and concentric therewith is outlet tube 102. This tube is open at the bottom thereof and is somewhat shorter than the inner pressure tube 87 but tube 102 extends upwardly from the assembly and communicates through plug 89, by which it is supported, with steam outflow cavity 103. Superheat fuel, preferably in the form of ceramic rods or other ceramic shapes, as shown by clad rods 104, are carried on the exterior of outlet tube 102 by means of appropriate clamp ring 106 and pins 107 or other means conventional within the art.

In the operation of a reactor utilizing the foregoing fuel element assembly, the core is loaded by initially inserting outer retainer tubes 84 into aligned grid apertures while reactor control rods are fully inserted. The remaining superheat portion of each fuel assembly 81 is then suitably fastened and suspended from the base of plug 89 and the plug is lowered into place. Unless a large pressure drop is contemplated the plug and other cooperating members need not be machined for close tolerances and normal weights of the materials are sufficient to overcome the pressure differential. The coolant level in the core cavity 68 (FIG. 3) is adjusted to a level near to or above the steam outlet and of outer tubes 54 so that there is approximately equal pressure on both the interior and exterior walls. The inner pressure tube 87 is closed at the bottom at 112 and the upper end is above the fluid line of the reactor.

After complete assembly of all fuel elements within the reactor grids (FIG. 3), the superheat plenum cover 72 and the cover 53 are sealed. The generation of fission heat is then initiated by proper removal of control rods and the reactor functions in accordance with the design, producing heat both within the outer annular fluid channel and within the superheat channel. Water or coolant within the outer passage 96 is heated, and some steam is produced, which rises upwardly into the saturated steam plenum 113. As a small amount of pressure is built up the steam forces the water from the superheat passage 114 and flows into the steam outlet tube 102 which leads to the steam outlet chamber 103. The actual temperature of each of the foregoing passages, the amount of steam produced and the steam pressure of course depends upon a number of variables such as amount, type and disposition of fuels, materials of construction, etc.

It should be emphasized that the disposition of the various fuel element assembly components relative to one another within each assembly, as described, and the selection of materials of construction for each component, aids materially in improving the neutron economy of a reactor core employing a plurality of assemblies. Specifically, materials of construction for containment of the superheated steam in the present state of the art most generally have a higher neutron thermal cross section than the metals and cladding used at lower temperatures and pressures. Accordingly, it will be seen in FIGURE 4 that tubes 87 and 102, together with insulating liner 99, which all tend to absorb neutrons, are disposed inwardly of the outer fuel assembly 92 where the neutron flux tends to be greater because of the greater volume of fuel and the higher density of the water and/or liquid coolant moderator and also because of the liquid or solid moderator exterior of the fuel assemblies 81.

While the foregoing represents the preferred embodiment of the invention dictated by such practical considerations as the outlet temperature desired and the accompanying limitations of materials and geometrical shapes, the invention is adaptable to many varying embodiments and modifications.

For example, the piping and heater systems described and shown in FIGURE 3 in which the core assemblies of the invention are adapted to a specific superheat design would be modified in the event the primary coolant heated in the outer annular space were a nonaqueous liquid, as described in connection with the fragmentary embodiment shown in FIGURE 2.

Figure 7:
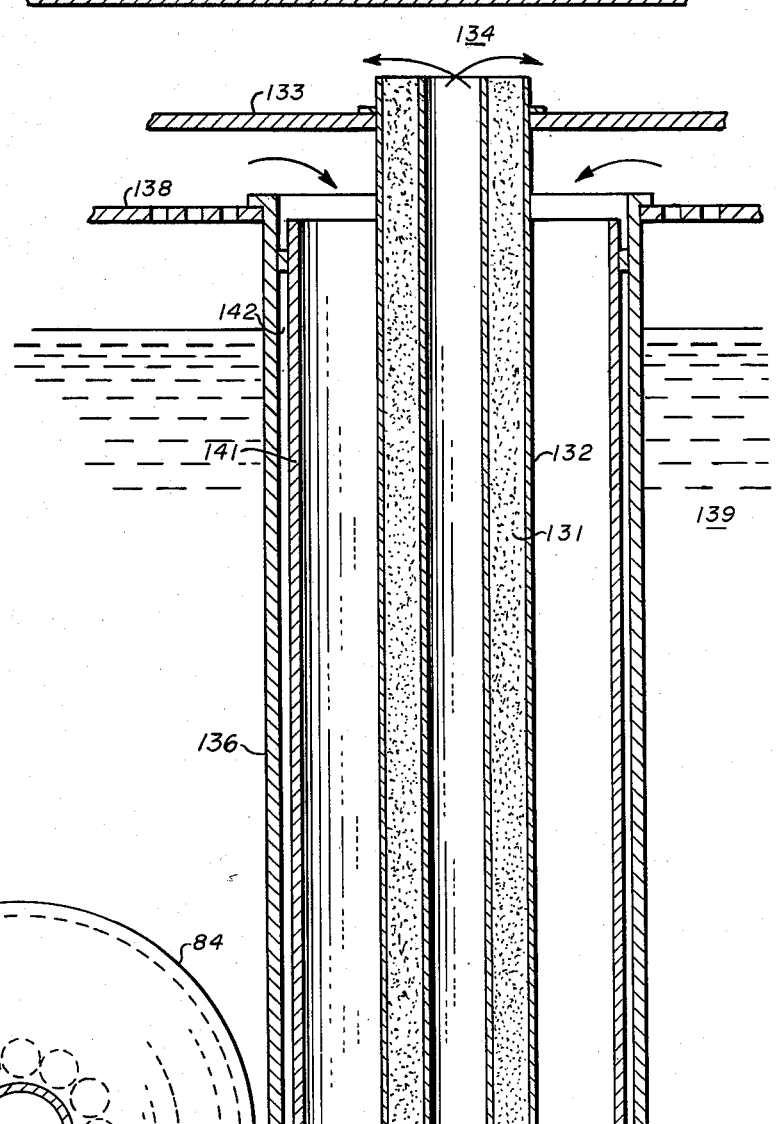
FIGURE 7 is a cross sectional side view of two concentric tubular fuel elements assembled in combination with core components.
Figure 8:
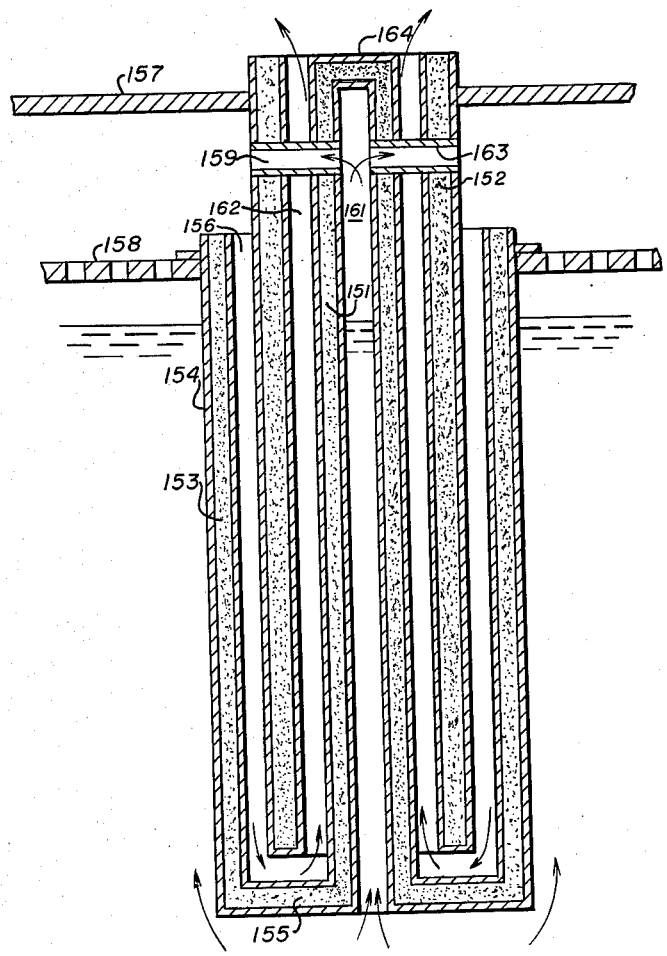
FIGURE 8 is a cross sectional side view of three concentric tubular fuel elements assembled in combination with other core components.

Several additional alternate preferred embodiments of fuel element assemblies are shown in FIGURES 6 through 8. In FIGURE 6 the fuel in the outer annulus 121 consists of rectangular bars 122 clad with extended surface cladding 123. This configuration is applicable to the use of metallic fuels such as uranium metal alloys. The principal advantage of this geometry is that only one simple cladding extrusion is required, and the basic cladding process is therefore simpler. Also, the width of the fuel, and hence the amount of fuel in the water or organic cooled region 121 may be easily varied. These advantages could also be obtained by using cylindrical fuel pins rather than rectangular bars. Other parts of the construction shown in FIGURE 6 are similar to those of the preferred embodiment of FIGURES 4 and 5.

Two additional embodiments of preferred superheat elements are shown in FIGURES 7 and 8. In FIGURE 7 there is shown an annular steam heating fuel cylinder 131 with exterior cladding 132 mounted through tubesheet 133 of steam exit plenum 134. Concentric fuel cylinder 136 having closed bottom 137 surrounds inner cylinder 131, the outer cylinder 136 being mounted through grid plate 138, parallel with and below chamber wall 133. Boiling water moderator 139 surrounds the exterior of outer cylinder 136. The outer cylinder mechanically isolates the superheated steam from the boiling water moderator. Heat is transmitted to the boiling fraction through the steam outside the annular fuel at a rate somewhat proportional to total superheated steam flow and, therefore, to reactor power. The proportionality of boiling heat transfer rate to reactor power level would tend to minimize the effects of the actual power and core burnup. Inclusion of concentric insulating cylinder 141 of steel within outer cylinder 136, by which insulating dead space 142 is created, also serves to control the passage of heat outward through cylinder 136.

Somewhat similar construction having a plurality of concentric fuel cylinders is shown in FIGURE 8 in which may be seen concentric fuel cylinders 151, 152, and 153, respectively, each cylinder being clad inside and out as indicated by number 154. Inner and outer cylinders 151 and 153 are closed at the bottom 155 and the intermediate cylinder 152 is somewhat shorter, creating a superheating passage 156. Innermost cylinders 151 and 152 are top mounted to penetrate chamber wall 157 leading into a superheated steam plenum. Outer cylinder 153 is mounted in lower parallel grid 158 and radial passages 159, which provides a passage between central passage 161 and superheating passage 156, are formed by means of welded tubes 163. Inner cylinder 151 is closed by top 164. In this geometrical arrangement the outer element 153 transfers heat outward to the water and inward to the steam; the innermost or intermediate cylindrical element transfers its heat almost entirely to the steam. Other embodiments may be created by the use of additional concentric cylinders.

What is claimed is:

1. In a fuel element assembly adapted to be rigidly supported within the core of a superheat boiling water reactor, the combination comprising an outer containment tube adapted for forced introduction of primary coolant into one end thereof and for discharge of said coolant from the other end thereof into a heat exchanger means exterior of said fuel assembly, said outer containment tube composed of a construction material having a low thermal neutron cross section for circulation of a primary coolant therein, a first concentric inner tube having a closed bottom rigidly supported within said outer tube, a second concentric inner tube rigidly disposed within said first concentric inner tube, said second inner tube ending in spaced relation from the bottom of said first inner tube and extending from the top of said first inner tube, said second inner tube being open at the bottom, said first concentric inner tube adapted to receive wet steam from said exchanger at the open end thereof and said second concentric inner tube adapted for the discharge of superheated steam at the end thereof which is not in spaced relation from the bottom of said first inner tube, insulating liner means supported rigidly within said first concentric inner tube in spaced relation therewith, said first and second inner concentric tubes and said liner being constructed of materials having high structural strength at high temperatures and at least moderately low thermal neutron cross sections, a first quantity of fissile fuel uniformly supported around and along the annulus between said inner and outer tubes, and a second quantity of fissile fuel uniformly supported around and along the annulus between said liner and second inner tube.

2. In a fuel element assembly in combination with reactor structure and adapted to be rigidly supported by grid plates within the core of a superheat boiling water reactor, the combination comprising a vertically orientated outer containment tube open at the bottom and top thereof, said outer containment tube being composed of a construction material having a low thermal neutron cross section, first and second concentric inner tubes rigidly supported within said outer tubes, said second tube being disposed within said first inner concentric tube, said first concentric inner tube having a closed bottom and said second concentric inner tube ending in spaced relation with said bottom, one of said inner concentric tubes being adapted to receive fluid discharged from the open top of said outer containment tube, transmission means connected to the top of the other inner concentric tube for withdrawing superheated steam therefrom, metallic insulating liner means supported rigidly in spaced relation within said first concentric inner tube to create an area of low thermal conductivity between said insulating liner means and said first inner tube, thereby limiting the radial flow of heat through said area, said first and second concentric inner tubes and said liner means being constructed of materials having high structural strength at high temperatures and at least moderately low thermal neutron cross sections, a first quantity of fissile fuel material uniformly supported around and along the annulus between said inner and outer tubes, and a second quantity of fissile fuel uniformly supported around and along the annulus between said liner and second inner concentric tubes.

3. In a fuel element assembly in combination with reactor structure and adapted to be rigidly supported within the core of a superheat water boiling reactor, the combination comprising a rigidly mounted closed outer containment tube, said outer tube being composed of a construction material having a low thermal neutron cross section, means for introducing primary coolant into one end of said outer containment tube, header means for discharging primary coolant from the other end of said outer containment tube into a heat exchanger exterior said assembly, first and second concentric inner containment tubes rigidly supported within said outer tube, said first concentric inner tube being closed at one end, said second inner concentric tube being rigidly supported within said first tube and ending in open spaced relation to said bottom of said first inner tube, metallic insulating liner means rigidly supported in spaced relation within said first concentric inner tube to create an area of low thermal conductivity between said liner means and said first inner concentric tube, thereby limiting radial flow of heat through said area, said first and second concentric inner tubes and said liner means being constructed of materials having high structural strength at high temperatures and at least moderately low thermal neutron cross sections, header means for introducing wet steam from said exterior heat exchanger into the open end of said first concentric inner tube, header means for discharging superheated steam from said second inner concentric tube, a first quantity of fissile fuel material uniformly supported around and along the annulus between said inner and outer tubes, and a second quantity of fissile fuel material uniformly supported around and along the annulus between said liner means and said second concentric tube.

References Cited in the file of this patent

UNITED STATES PATENTS

| | | |
|---|---|---|
| 2,926,127 | McCorkle | Feb. 23, 1960 |
| 2,949,416 | Wheelock | Aug. 16, 1960 |
| 2,999,059 | Treshow | Sept. 5, 1961 |
| 3,000,728 | Long et al. | Sept. 19, 1961 |
| 3,070,537 | Treshow | Dec. 25, 1962 |
| 3,071,527 | Young | Jan. 1, 1963 |

FOREIGN PATENTS

| | | |
|---|---|---|
| 122,563 | Great Britain | Jan. 30, 1919 |
| 754,183 | Great Britain | Aug. 1, 1956 |
| 1,198,728 | France | June 15, 1959 |
| 1,218,251 | France | Dec. 14, 1959 |
| 845,405 | Great Britain | Aug. 24, 1960 |
| 875,329 | Great Britain | Aug. 16, 1961 |